(12) United States Patent
Imai (10) Patent No.: US 8,908,013 B2
(45) Date of Patent: Dec. 9, 2014

(54) SYSTEMS AND METHODS FOR COLLABORATIVE IMAGE CAPTURING

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 13/010,614

(22) Filed: Jan. 20, 2011

(65) Prior Publication Data
US 2012/0188344 A1 Jul. 26, 2012

(51) Int. Cl.
H04N 13/02 (2006.01)
H04N 5/247 (2006.01)
H04N 5/232 (2006.01)
H04N 9/04 (2006.01)
H04N 5/235 (2006.01)
H04N 9/09 (2006.01)

(52) U.S. Cl.
CPC ........... *H04N 13/0271* (2013.01); *H04N 5/247* (2013.01); *H04N 13/0242* (2013.01); *H04N 5/232* (2013.01); *H04N 9/045* (2013.01); *H04N 5/235* (2013.01); *H04N 9/09* (2013.01)
USPC ......................................................... 348/47

(58) Field of Classification Search
USPC ......................................................... 348/47
See application file for complete search history.

(56) References Cited

U.S. PATENT DOCUMENTS

| 7,149,325 | B2 | 12/2006 | Pavlidis |
| 7,450,735 | B1 | 11/2008 | Shah |
| 7,675,478 | B2 | 3/2010 | Yamazaki |
| 7,677,816 | B2 | 3/2010 | Aoki |
| 7,697,720 | B2 | 4/2010 | Low |
| 7,791,671 | B2 | 9/2010 | Schultz |
| 2005/0090907 | A1 | 4/2005 | Hudson |
| 2005/0185049 | A1* | 8/2005 | Iwai et al. ................... 348/47 |
| 2006/0066730 | A1 | 3/2006 | Evans |
| 2007/0005156 | A1 | 1/2007 | Moinvaziri |
| 2008/0084473 | A1 | 4/2008 | Romanowich |
| 2008/0112699 | A1 | 5/2008 | Huseth |
| 2008/0122958 | A1 | 5/2008 | Huseth |
| 2008/0297593 | A1* | 12/2008 | Debevec et al. ............... 348/51 |
| 2009/0185173 | A1* | 7/2009 | Ashdown et al. ............. 356/121 |
| 2009/0225164 | A1* | 9/2009 | Renkis ........................ 348/143 |
| 2009/0231441 | A1* | 9/2009 | Walker et al. .............. 348/207.1 |

(Continued)

OTHER PUBLICATIONS

Kleihorst, "Smart Camera Mote with High Performance Vision System", ACM SenSys 2006 Workshop on Distributed Smart Cameras (DSC 2006).

(Continued)

*Primary Examiner* — Dave Czekaj
*Assistant Examiner* — Tracy Li
(74) *Attorney, Agent, or Firm* — Canon U.S.A., Inc. IP Division (57) ABSTRACT

Systems and methods for collaborative imaging include a device for collaborative image capturing device comprising a computational image sensor including a imaging sensor configured to detect light signals from a field of view, and one or more processors configured to control at least one parameter of the imaging sensor and to adjust the at least one imaging sensor parameter based on a respective light signal detected by one or more other computational image sensors, and a network interface configured to exchange data with the one or more other computational image sensors, wherein the exchanged data indicates the respective light signals detected by the one or more other computational image sensors.

14 Claims, 6 Drawing Sheets

(56) References Cited

U.S. PATENT DOCUMENTS

2010/0066835 A1 3/2010 Colciago
2010/0073482 A1 3/2010 Samarasekera
2010/0128137 A1 5/2010 Guidash
2010/0158494 A1 6/2010 King
2010/0194921 A1 8/2010 Yoshioka

OTHER PUBLICATIONS

Yang, "A Real-Time Distributed Light-Field Camera" Eurographics Workshop on Rendering (2003) pp. 1-10.

* cited by examiner

SYSTEMS AND METHODS FOR COLLABORATIVE IMAGE CAPTURING

BACKGROUND

1. Field of the Disclosure

The present disclosure relates generally to collaborative imaging.

2. Description of the Related Art

When capturing an image of a scene, the limitations of a camera may prevent the camera from capturing all desired information about a scene, such as perspectives and spectral information. Some software applications allow a user to perform some image adjustment or correction afterwards, but the adjustments or corrections may require interpolation, consume lots of time and computing resources, or fail to correct or restore all the lost lighting information. For example, a two dimensional RGB image does not capture depth information, and extracting depth information from the two dimensional RGB image is computationally intensive and provides only limited depth information—most of the depth information is lost.

Additionally, most imaging sensors have a directional field of view, and capturing a wide field of view requires either a wide angle lens or stitching images together. Also, the panoramic images that are created by wide angle lenses have only one point of view, and stitched images require correction of optic distortions, misalignments, and mis-registration. A user may compensate for some of these limitations by taking multiple images of a scene with different camera settings or from different positions and then combining the images, but this requires extra storage space for the additional images and extra time to adjust the settings and move to a different position.

SUMMARY

In one embodiment, a device for collaborative image capturing comprises a computational image sensor including a imaging sensor configured to detect light signals from a field of view, and one or more processors configured to control at least one parameter of the imaging sensor and to adjust the at least one imaging sensor parameter based on a respective light signal detected by one or more other computational image sensors, and a network interface configured to exchange data with the one or more other computational image sensors, wherein the exchanged data indicates the respective light signals detected by the one or more other computational image sensors.

In one embodiment, a method for capturing an image comprises receiving light signal data from two or more imaging sensors, wherein an imaging sensor is configured to detect a light field from a field of view and generate light signal data based on the detected light field, receiving position data from the two or more imaging sensors, wherein position data indicates one or more of location and spatial orientation of a respective imaging sensor, and generating a combined image based on the light signal data and the position data received from the two or more imaging sensors.

In one embodiment, a computer-readable medium stores instructions that, when executed by one or more computing devices, cause the one or more computing devices to perform operations comprising generating a combined image of a scene from a plurality of component images of the scene, wherein the plurality of component images are obtained from a plurality of respective imaging sensors, and wherein a component image indicates light signals detected by a respective imaging sensor while one or more imaging sensor parameters of the respective imaging sensor are configured to one or more settings, generating adjustment data including an adjustment for a setting of a imaging sensor parameter for a respective imaging sensor based on the combined image, and transmitting the adjustment data to the respective imaging sensor.

DETAILED DESCRIPTION OF CERTAIN EMBODIMENTS

The following description is of certain illustrative embodiments, and the disclosure is not limited to these embodiments, but includes alternatives, equivalents, and modifications such as are included within the scope of the claims. Additionally, the illustrative embodiments may include several novel features, and a particular feature may not be essential to practice the systems and methods described herein.

Figure 1:
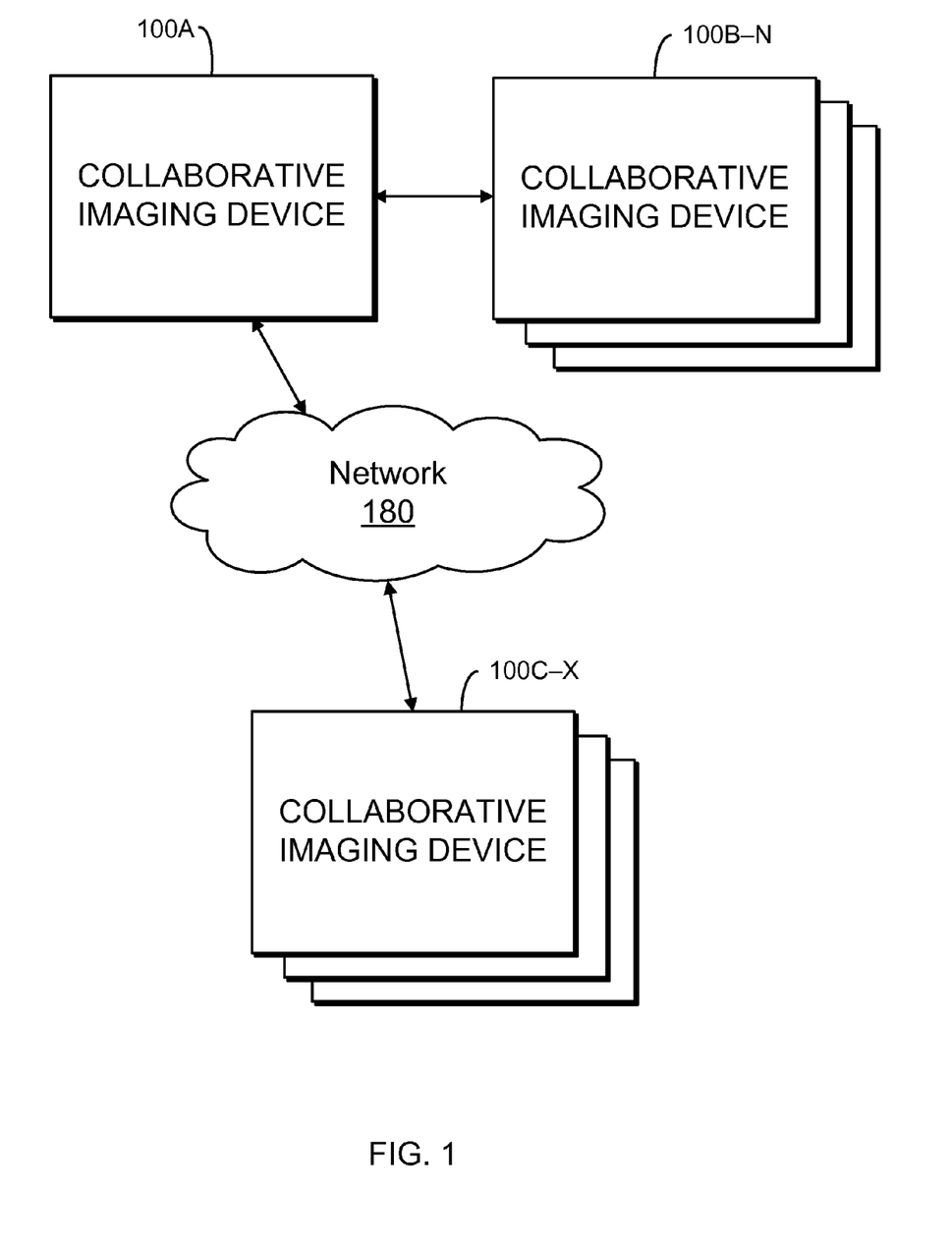
FIG. 1 is block diagram illustrating a system for collaborative image capturing.

FIG. 1 is a block diagram illustrating a system for collaborative image capturing. The system includes a collaborative imaging device 100A in communication with one or more collaborative image devices 100B-N (where "N" represents any number of collaborative imaging devices capable of communicating with the collaborative imaging device 100A), via wired or wireless channels (e.g., Wifi, RF, infrared, USB, serial port). The collaborative imaging device 100A is also in communication with one or more other collaborative imaging devices 100C-X (where "X" represents any number of collaborative imaging devices capable of communicating with the collaborative imaging device 100A) via the network 180. The network 180 may include any combination of one or more networks, including the Internet, WANs, and LANs as well as any combination of wired or wireless networks.

The collaborative imaging devices 100A, 100B-N, 100C-X are each configured to capture image data. Depending on the embodiment, one or more of the collaborative imaging devices 100A, 100B-N, 100C-X include plenoptic cameras and/or are capable of detecting light fields (e.g., 4D or 5D light fields), have tunable spectral sensitivities, and/or are capable of detecting a broader spectrum of light than the human eye can detect. The collaborative imaging devices 100A, 100B-N, 100C-X may be used by a single user or a group of users (e.g., a family or a group of friends) to capture more image information than a single imaging device can capture. For example, the members of a family on vacation may point their respective imaging device at a scene (e.g., the Eiffel Tower, Times Square, the White House, Delicate Arch, a group of penguins, a basketball game) and the devices cooperate and coordinate to capture different image information (e.g., some or all of the image information is different between imaging devices) from the scene. By way of another example, the collaborative imaging devices used by a group of strangers at an athletic event may capture more image information about scenes of the event than could be captured by a single collaborative imaging device by cooperating and coordinating the capturing of the image information and sharing the captured image information with the other collaborative imaging devices.

Figure 2:
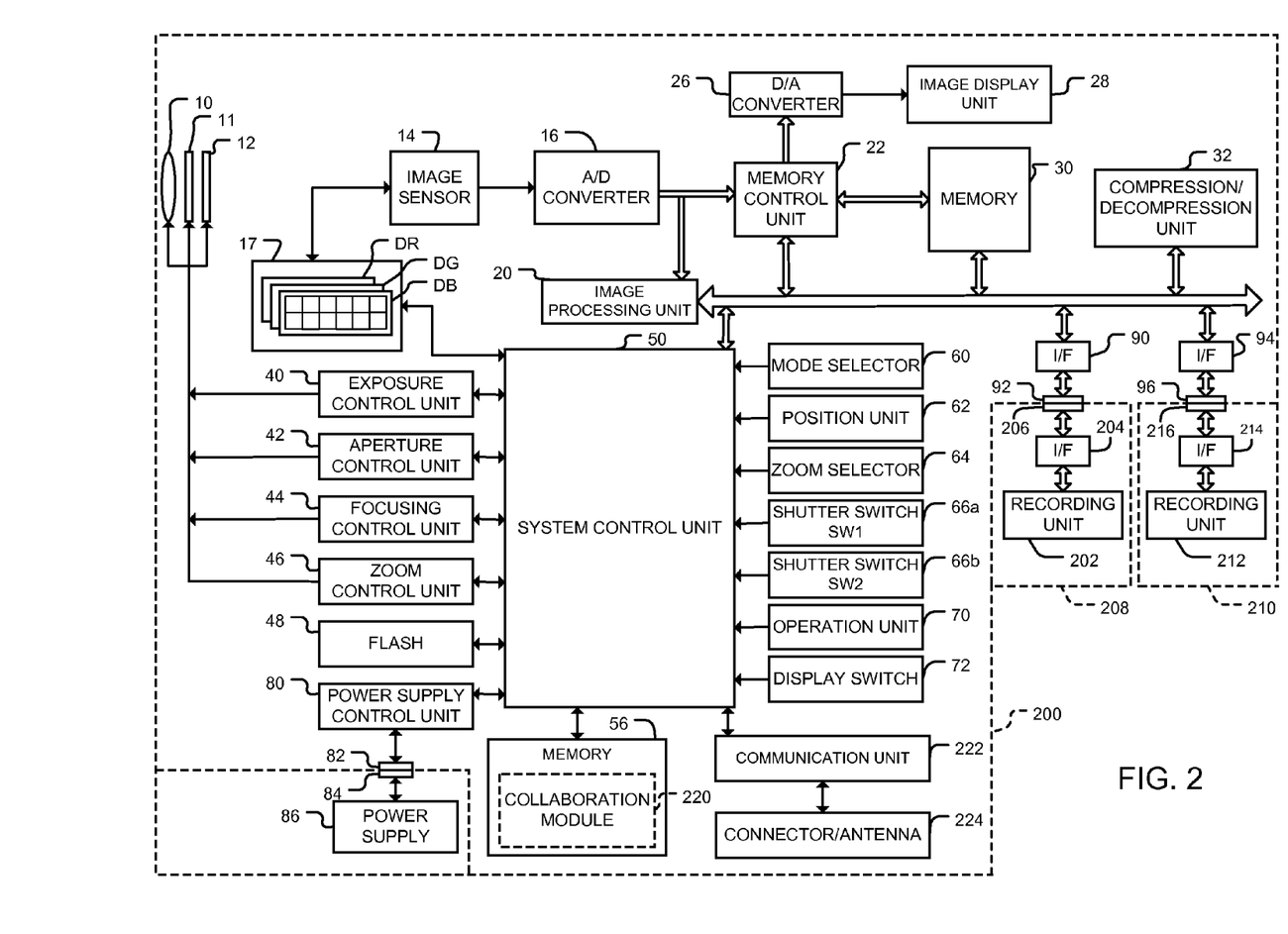
FIG. 2 is a block diagram illustrating an embodiment of a collaborative imaging device.

FIG. 2 is a block diagram illustrating an embodiment of a collaborative imaging device 200. The collaborative imaging device 200 includes a lens 10 (which may include a plurality of lenses, including a microlens array), an aperture 11 (which may include a plurality of apertures), shutter 12, and an image sensor 14 that converts incident electromagnetic radiation (e.g., an optical image) into an electrical signal and that may have a spectral response that is tunable by adjusting one or more capture parameters. Furthermore, in other embodiments the lens 10, aperture 11, and shutter 12 may be arranged differently than is shown in the embodiment of FIG. 2.

Electromagnetic radiation (also referred herein as "light") from a scene (e.g., an object in the scene) passes through the lens 10, the aperture 11, and the shutter 12, when open, and forms an optical image on an image sensing surface of the image sensor 14. The image sensor 14 converts the optical image to analog image signals and outputs the signals to an ND converter 16. The ND converter 16 converts the analog image signals to digital image signals.

The image sensor 14 can detect light in the spectrum visible to the human eye and/or in the spectrum that the human eye cannot detect (e.g., infrared, x-ray, ultraviolet, gamma rays). In some embodiments, the image sensor 14 can detect light fields, including 4 dimensional and 5 dimensional light fields. In the embodiment shown, the image sensor 14 has a spectral response which is tunable in accordance with a capture parameter 17. For each pixel, the image sensor 14 outputs three or more channels of color information, for example a red-like channel, a green-like channel and a blue-like channel. The precise nature of the spectral responsiveness of image sensor 14 is specified by the capture parameter 17. In this embodiment, the capture parameter 17 comprises of multiple spatial masks, such as one mask for each channel of information output by image sensor 14. Thus, for example, where image sensor 14 outputs three or more channels, capture parameter 17 includes a spatial mask DR for the red-like channel of information, a spatial mask DG for the green-like channel of information, and a spatial mask DB for the blue-like channel of information. Each spatial mask comprises an array of control parameters corresponding to pixels or regions of pixels in image sensor 14. The spectral responsiveness of each pixel and/or each region of pixels is thus tunable individually and independently of other pixels or regions of pixels.

The image sensor 14 may include transverse field detector (TFD) sensor, and spatial masks DR, DG, and DB may correspond to voltage biases applied to control electrodes of the TFD sensor. A TFD sensor has a tunable spectral responsiveness that can be adjusted by application of bias voltages to control electrodes. In some TFD image sensors, the spectral responsiveness is tunable globally, meaning that all pixels in the image sensor are tuned globally to the same spectral responsiveness. In other TFD sensors, the spectral responsiveness is tunable on a pixel by pixel basis or a region-by-region basis. Bias voltages are applied in a grid-like spatial mask, such that the spectral responsiveness of each pixel is tunable individually of other pixels in the image sensor, or such that the spectral responsiveness of each region including multiple pixels is tunable individually of other regions in the image sensor. Also, in some embodiments the collaborative imaging device 200 includes one or more tunable filters (e.g., tunable color filter arrays) and a monochromatic sensor. The tunable filters may be adjusted similar to the adjustment of a tunable imaging sensor, including the use of spatial masks, global tuning, regional tuning, and pixel-by-pixel tuning, as well as temporal tuning.

The collaborative imaging device 200 also includes an image processing unit 20, which applies resize processing, such as predetermined interpolation and reduction, and color conversion processing to data from the ND converter 16 or that from the memory control unit 22. The image processing unit 20 performs predetermined arithmetic operations using the captured image data, and the collaborative imaging device 200 performs exposure control and ranging control based on the obtained arithmetic result. The collaborative imaging device 200 can perform TTL (through-the-lens) AF (auto focus) processing, AE (auto exposure) processing, and EF (flash pre-emission) processing. The image processing unit 20 further performs TTL AWB (auto white balance) operations based on the obtained arithmetic result.

Output data from the A/D converter 16 is written in a memory 30 via the image processing unit 20 and/or memory control unit 22. The memory 30 stores image data that is captured by the image sensor 14 and converted into digital data by the ND converter 16. The memory 30 may store images (e.g., still photos, videos) and other data, for example metadata and file headers for captured images.

The memory 30 may also serve as an image display memory. A D/A converter 26 converts digital data into an analog signal and supplies that analog signal to an image display unit 28. The image display unit 28 presents images according to the analog signal from the D/A converter 26 on a screen of a display (e.g., a liquid crystal screen of an LCD display).

A compression/decompression unit 32 compresses and decompresses image data, for example by applying an adaptive discrete cosine transform (ADCT) or the like. The compression/decompression unit 32 loads captured image data stored in the memory 30, compresses the data, and writes the compressed data in the memory 30. Also, the compression/decompression unit 32 decompresses compressed image data loaded from a detachable recording unit 202 or 212 and writes the processed data in the memory 30.

An exposure control unit 40 controls the shutter 12. The exposure control unit 40 may also have a flash exposure compensation function that links with a flash (flash emission device) 48. The flash 48 has an AF auxiliary light projection function and a flash exposure compensation function. An aperture control unit 42 controls the size of the aperture 11. A focusing control unit 44 controls the focus of the lens 10, and a zoom control unit 46 controls the angle of view of the lens 10. The exposure control unit 40, aperture control unit 42, focusing control unit 44, and zoom control unit 46 may each partially control the lens 10, aperture 11, and shutter 12, and may also communicate with each other to determine appropriate settings for the lens 10, aperture 11, and shutter 12.

A memory 56 is a readable and writable memory, and may include, for example, an EEPROM, a semiconductor memory (e.g., a solid state drive, SRAM, DRAM), a magnetic disc, etc. The memory 56 may store computer-executable programs and data for operation of a system control unit 50. The system control unit 50 includes one or more processors and reads and performs computer-executable instructions, such as instructions stored in the memory 56. Note that the computer-executable instructions may include those for the performance of various methods described herein. The memory 56 is an example of a non-transitory computer-readable memory medium, having stored thereon computer-executable instructions, as described herein.

The memory 56 may also store pre-designated capture parameters for the image sensor 14 (and/or a tunable color filter array) to control spectral responsiveness of the image sensor 14. In this embodiment, the capture parameters are comprised of spatial masks. The system control unit 50 may also generate masks and store the masks in the memory 56. The masks may be generated based on a comparison of captured images and/or may be based on a comparison of two or more scenes.

The memory 56 includes a collaboration module 220. A module includes instructions that may be executed by the collaborative imaging device 200 to cause the collaborative imaging device 200 to perform certain operations, though for ease of description a module may be described as performing the operations. Modules may include logic and/or computer readable instructions and may be implemented in software, firmware, and/or hardware. In other embodiments, the collaborative imaging device 200 may include more or less modules, the modules may be combined into fewer modules, or the modules may be divided into more modules. The collaboration module 220 may be executed to cause the collaborative imaging device 200 to communicate and collaborate with other collaborative imaging devices to capture image information (e.g., performing the methods described herein).

The collaborative imaging device 200 also includes a mode selector 60 that sets the operation mode of the collaborative imaging device 200 to still image recording mode, movie recording mode, playback mode, master mode, slave mode, etc. The shutter switch SW1 66a may be activated in the middle of operation (half stroke) of a shutter button, and generate a first shutter switch signal. Also, the shutter switch SW2 66b may be activated upon a full stroke of the shutter button, and generates a second shutter switch signal. In other embodiments, the shutter switches SW1 66a and SW2 66b may be activated by different controls. The system control unit 50 may start the operations of the AF (auto focus) processing, AE (auto exposure) processing, AWB (auto white balance) processing, EF (flash pre-emission) processing, and the like in response to the first shutter switch signal. Also, in response to the second shutter switch signal, the system control unit 50 may perform and/or initiate a series of operations, including the following: reading image signals from the image sensing device 14, converting image signals into image data by the A/D converter 16, processing of image data by the image processor 20, writing image data to the memory 30, reading image data from the memory 30, compression of the image data by the compression/decompression circuit 32, and writing data to the recording medium 208 or 210.

A zoom selector 64 may be operated by a user to change the angle of view (zooming magnification or shooting magnification). The zoom selector 64 may include a slide-type member, a lever, and/or a switch. The display switch 72 activates and deactivates the image display unit 28. A position unit 62 detects a location and/or orientation of the collaborative imaging device 200. The position unit 62 may include, for example, a global positioning system (GPS), a compass, an attitude indicator, an altimeter, an accelerometer, an optical flow analyzer, and/or a gyroscope.

The operation unit 70 may include various buttons, touch panels and so on. In one embodiment, the operation unit 70 includes a menu button, a set button, a macro selection button, a multi-image reproduction/repaging button, a single-shot/ serial shot/self-timer selection button, a forward (+) menu selection button, a backward (−) menu selection button, and the like. The operation unit 70 may also set and change the flash operation mode. The settable modes include auto, flash-on, red-eye reduction auto, and flash-on (red-eye reduction). The operation unit 70 may be used to select a storage format for the captured image information, including JPEG (Joint Photographic Expert Group) and RAW formats. The operation unit may set the collaborative imaging device 200 to a plural-image shooting mode, wherein data from a plurality of images data can be recorded in response to a single shooting instruction by a user. This may include auto bracketing, wherein one or more shooting parameters (e.g., white balance and exposure) are altered in each of the images.

The operation unit 70 may also set a communication mode for the collaborative imaging device 200. The communication modes include a stand-alone mode, an open access mode, and a secure access mode. In the stand alone mode, the collaborative imaging device 200 does not share image data with other collaborative imaging devices. In open access mode, the collaborative imaging device 200 shares image data with every other collaborative imaging device within range that will share image data and may search for other collaborative imaging devices in communication range. In secure access mode, the collaborative imaging device 200 shares image data only with other devices (e.g., collaborative imaging devices) that are within a predetermined network and/or that can provide proper authentication and/or authorization credentials. For example, in some embodiments, while in secure access mode, the collaborative imaging device 200 receives and transmits authentication requests, verifies received credentials, and transmits credentials and the results of authorization and authentication operations to other devices.

A power supply control unit 80 detects the existence/absence of a power source, the type of the power source, and a remaining battery power level, and supplies a necessary voltage to other components as required. A power supply 86 includes a battery, such as an alkaline battery, a lithium battery, a NiCd battery, a NiMH battery, and an Li battery, an AC adapter, and the like. The collaborative imaging device 200 and the power source 86 are connected by connectors 82 and 84.

The recording media 208 and 210 include recording units 202 and 212 that are configured with computer readable media, including semiconductor memories, magnetic disks, optical discs, etc., interfaces 204 and 214 for communication with the collaborative imaging device 200, and connectors 206 and 216. The connectors 206 and 216 are coupled to connectors 92 and 96 and interfaces 90 and 94 of the collaborative imaging device 200. Although the illustrated embodiment includes two systems of interfaces 90 and 94 and connectors 92 and 96 for connecting the recording media 208 and 210, a single or another plural numbers of interfaces and connectors may be included in other embodiments.

Additionally, a communication circuit 222 communicates with other devices, through channels such as USB, IEEE 1394, P1284, SCSI, modem, LAN, RS232C, and wireless communication. A connector/antenna 224 can connect the collaborative imaging device 200 to other devices via a wired connection and/or communicate wirelessly with other devices, including other collaborative imaging devices 200, printers, other computing devices, etc.

Figure 3:
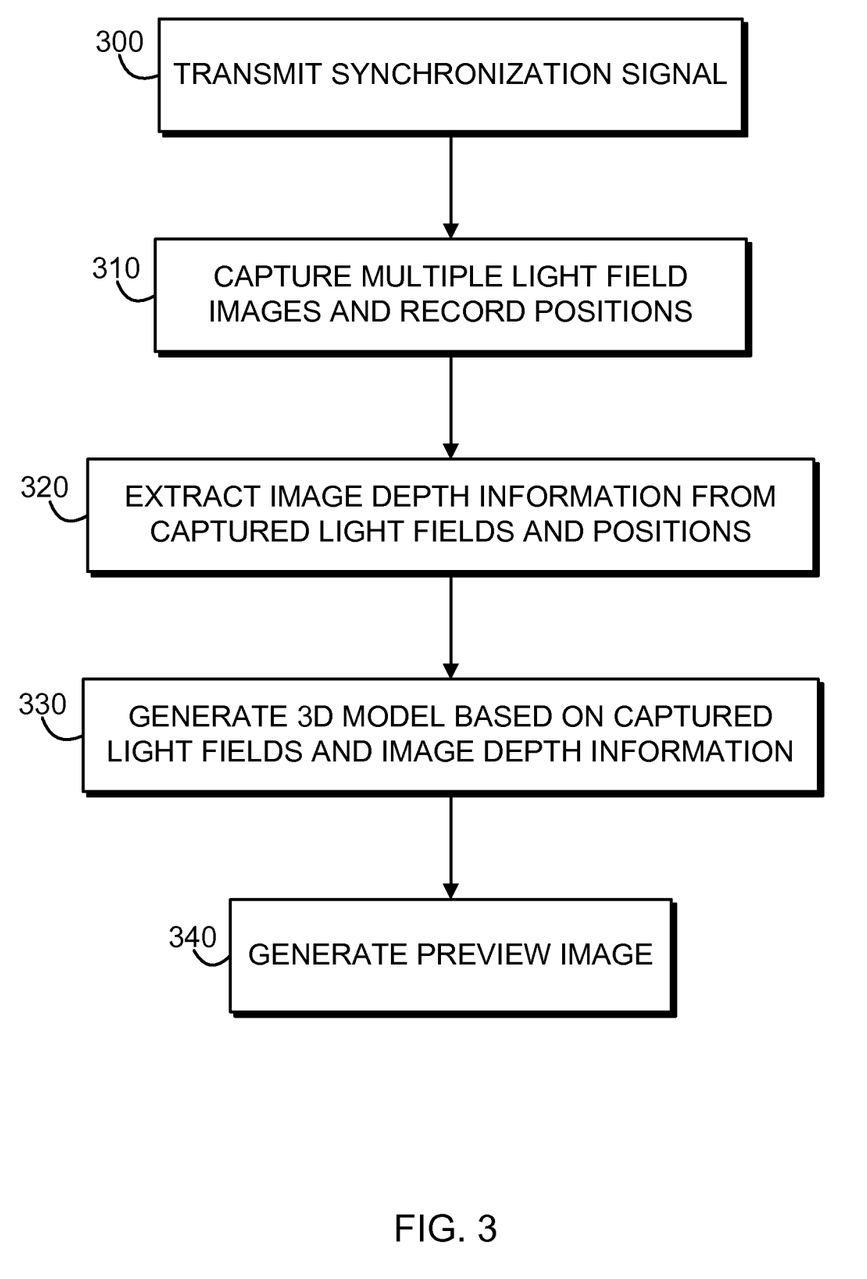
FIG. 3 is a flowchart illustrating an embodiment of a method for collaborative image capturing.

FIG. 3 is a flowchart illustrating an embodiment of a method for collaborative image capturing. Other embodiments of this method and the other methods described herein may omit blocks, may add blocks, may change the order of the blocks, may combine blocks, and/or may divide blocks into separate blocks. Additionally, components of one or more collaborative imaging devices may implement the method shown in FIG. 3 and the other methods described herein.

In block 300, a synchronization signal is transmitted to a collaborative imaging device. For example, a collaborative imaging device may transmit the synchronization signal to one or more other collaborative imaging devices, and the collaborative imaging devices may collectively negotiate the synchronization in response. Additionally, a collaborative imaging device operating in master mode may transmit a synchronization signal to collaborative imaging devices operating in slave mode. The synchronization signal may include timing data (e.g., a time, a countdown timer) that indicates when the collaborative imaging devices should capture respective images.

Proceeding to block 310, the collaborative imaging devices capture light field images and record their respective positions (e.g., location and/or orientation). The collaborative imaging devices may capture the light field images substantially simultaneously, such as in response to the synchronization signal or in response to a command to capture. Some or all of the captured images may have partially or completely overlapping fields of view of a scene taken from approximately the same orientation (e.g., arranged in an approximate line facing the same direction) and/or may have partially or completely overlapping fields of view of a scene taken from different orientations (e.g., arrange in a semi-circle and pointing toward the center of the circle). Additionally, some or all of the captured images may not have any overlap between their respective fields of view.

Next, in block 320, image depth information is extracted from the captured images and the positions of the collaborative imaging devices. The extraction operation(s) may be distributed among the collaborative imaging devices and/or a cloud computing service. Moving to block 330, a three-dimensional model of the scene is generated based on the captured light fields and the image depth information. Finally, in block 340, a preview image is generated (e.g., by one or more collaborative imaging devices and/or the cloud computing service), and the preview image may be sent to one or more of the collaborative imaging devices for presentation. Generation of the preview image and/or the three-dimensional model may include synthesizing the captured images, which may further include stitching at least some of the captured images together. The stitching can include, for example, optical analysis of the images (e.g., landmarks, histograms) and/or position analysis of the collaborative imaging devices. The preview image may have a low spatial resolution to reduce the computational intensity of generating the preview image. A master collaborative imaging device may manage the distribution of the depth extraction, model generation, and preview generation among one or more devices.

A display on a respective collaborative imaging device may present the preview image to a user. A collaborative imaging device may transmit a store message (e.g., in response to a user command) to the other collaborative imaging device(s) to store their respective captured images, and/or images received from other collaborative imaging devices, in a computer-readable medium and/or to send their respective captured and/or received image(s) to a device (e.g., a designated collaborative imaging device, a cloud device). One or more devices may already have received all the images (e.g., a device that generates the three-dimensional model or the preview image, a device operating in master mode), and a device that has already received all the images may store them. The store message may be transmitted by default, in response to a user command, in response to an expiration of a timer, in response to satisfaction of one or more predetermined criteria, etc. A final high resolution collaborative image may be generated later, or the final high resolution collaborative image could be generated immediately and stored on one or more designated devices. The collaborative imaging devices that do not store part or all of the images may then delete their respective captured and/or received images.

Furthermore, the light field data and/or the different perspectives of the collaborative cameras provide more depth information about the scene than a two-dimensional RGB image. The additional depth information allows the generation of a collaborative image which has a more detailed and accurate three-dimensional model of the scene. The collaborative image may allow post-capture adjustments to the focus, depth estimation, and glare reduction.

Figure 4:
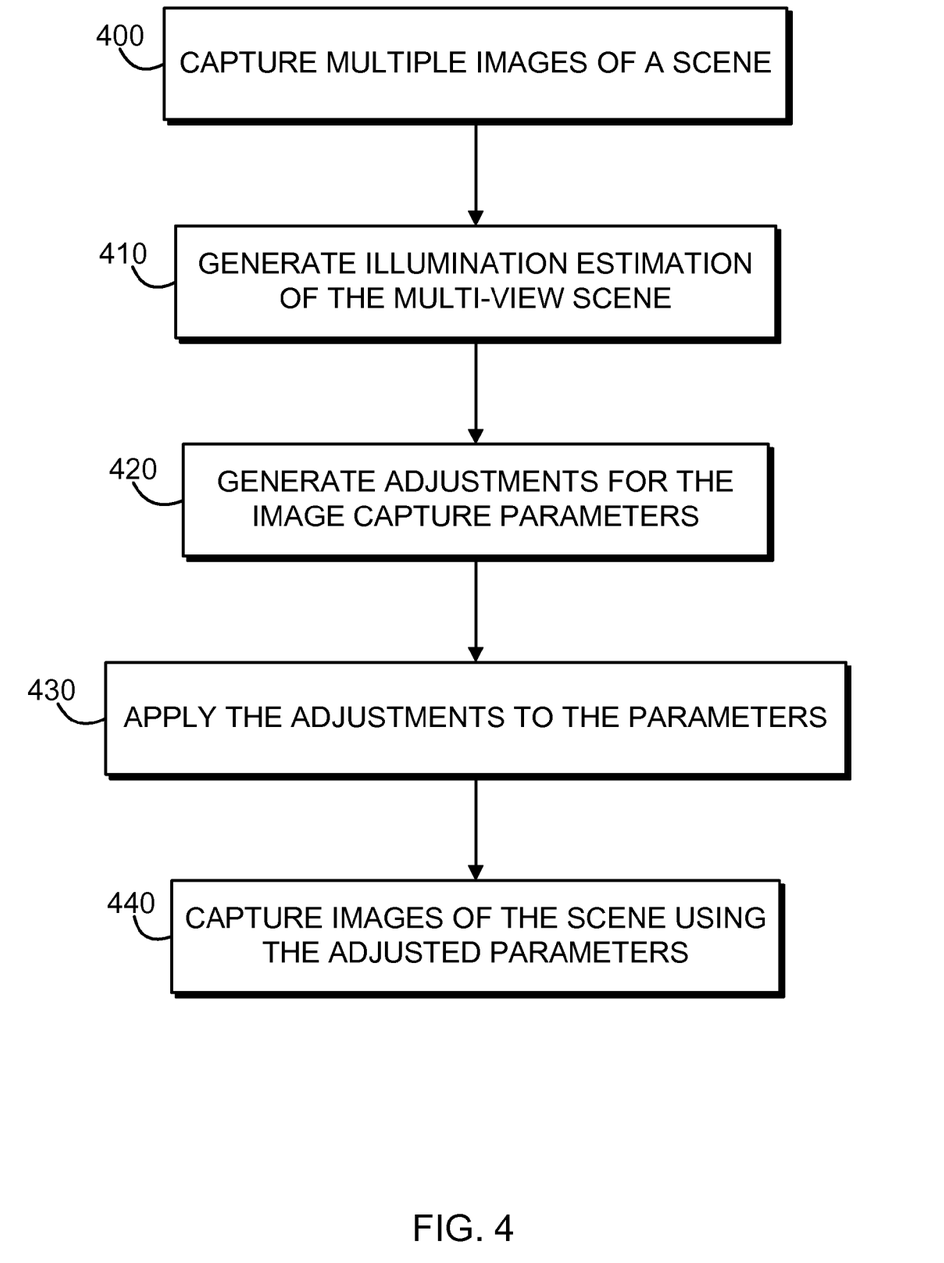
FIG. 4 is a flowchart illustrating an embodiment of a method for collaborative image capturing.

FIG. 4 is a flowchart illustrating an embodiment of a method for collaborative image capturing. In block 400, multiple images of a scene are captured, for example by respective collaborative imaging devices. The multiple images may include a mosaic of the scene with pre-determined spectra that captures multiple views of the scene and may also include the positions of the collaborative imaging devices that captured the images. The multiple images may be sent to one or more devices, such as a master device, one or more collaborative imaging devices not operating in master mode, a cloud service, and/or other computing devices.

Moving to block 410, an illumination estimation of the multi-view scene is generated. The illumination estimation may be generated using distributed processing (e.g., collaborative imaging devices, cloud computing, other computing devices) and may include an illumination estimation for each region of the scene and/or clustering pixels under the same or approximately the same illumination.

Next, in block 420, one or more adjustments are generated for one or more image capture parameters of respective collaborative imaging devices. The objective(s) of the adjustments may be to correct one or more colors captured by an imaging sensor and/or to capture a high dynamic range in a collaborative image synthesized from multiple images captured by respective imaging sensors. The adjustments may alter the parameters (e.g., the capture parameters) of the image sensors. In one embodiment, the adjustments are in the form of spatial voltage masks for respective tunable image sensors and/or tunable image filters, and generating the adjustments includes calculating a compensation signal and generating a spatial voltage mask based on the signal. The parameters may include, for example, a spectral sensitivity, a focal point, a brightness level, a depth of field, an aperture setting, a flash setting, an exposure time, and an ISO setting. A collaborative imaging device may generate its own adjustments and/or its adjustments may be generated by another computational imaging device, a cloud service, and/or other computing devices. For example, a master collaborative imaging device may generate the adjustments for one or more slave collaborative imaging devices.

In block 430, the adjustments are applied to the parameters, which may include transmitting the adjustments to the respective collaborative imaging device. Upon receiving the adjustments, the collaborative imaging devices adjust their parameters accordingly. For example, a collaborative imaging device may apply adjustments in the form of spatial voltage mask to its image sensor. Finally, in block 440, images of the scene are captured using the adjusted parameters. The communication between the collaborative imaging devices allows the collaborative imaging devices to capture a greater range of information from the scene, for example by capturing different fields of view, spectrums of radiation, angles, etc. The images may be captured in response to a capture signal transmitted by a master device, and the captured images may be combined to generate a multi-view color balanced image or a multi-view high dynamic range image.

Figure 5:
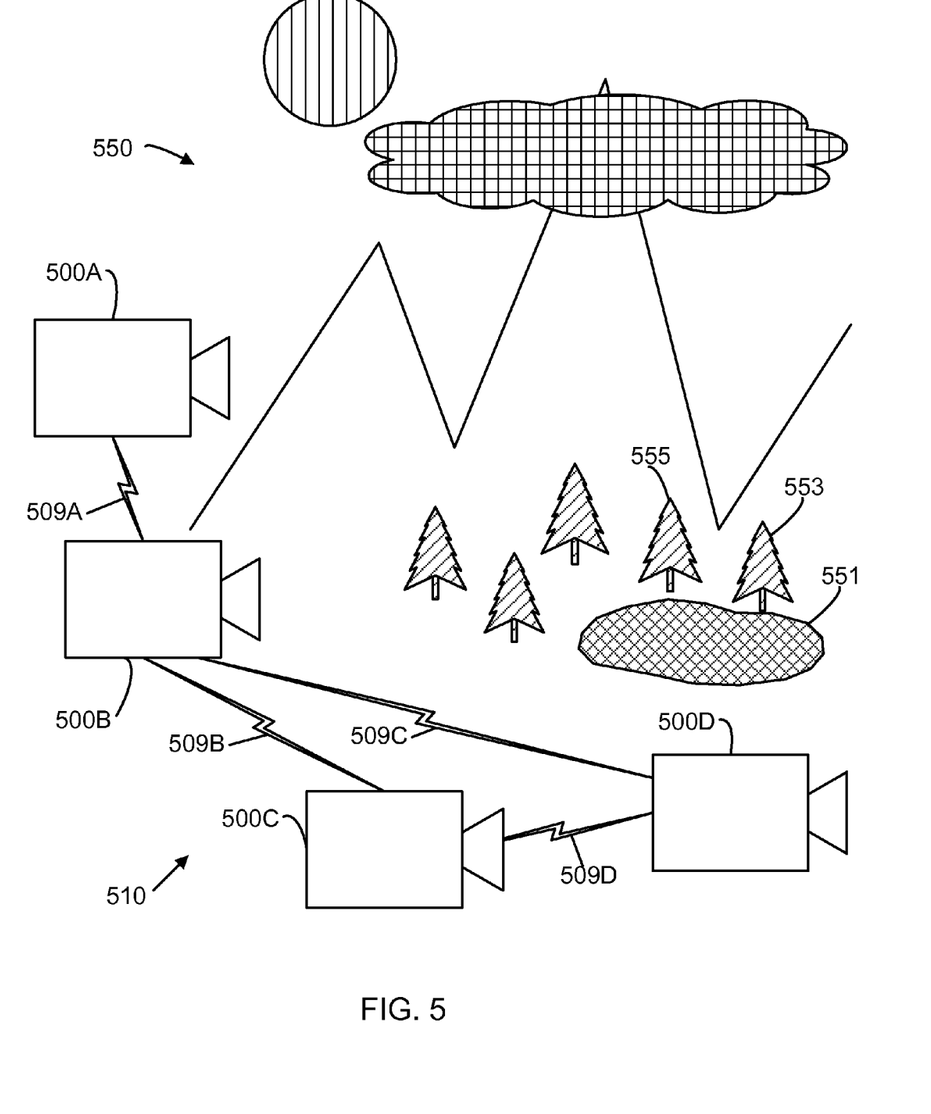
FIG. 5 is a block diagram illustrating an embodiment of a collaborative imaging system capturing a collaborative image.

FIG. 5 is a block diagram illustrating an embodiment of a collaborative imaging system 510 capturing a collaborative image of an illustrative scene 550. Collaborative imaging devices 500A-D are positioned such that at least part of the scene 550 is in a field of view of each of the collaborative imaging devices 500A-D. The collaborative imaging devices 500A-D communicate with one another via wireless links 509A-D. In the embodiment shown, not all of the collaborative imaging devices 500A-D can communicate with all the other collaborative imaging devices 500A-D (due to range, obstacles, etc.), though in other embodiments more or less of the collaborative imaging devices 500A-D can communicate with one another.

The collaborative imaging devices 500A-D have different perspectives of the scene 550. Capturing images (e.g., light field images) of the scene 550 from different perspective facilitates depth estimation and three-dimensional modeling of the scene 550. For example, the different perspectives of collaborative imaging devices 500A and 500D provide more information about the relative positions of a first object 551, a second object 553, and a third object 555 than could be acquired from a single perspective (e.g., the perspective of collaborative imaging device 500D). The collaborative imaging devices 500A-D can share and combine the captured images to generate a more detailed and accurate three-dimensional model of the scene 550. Furthermore, combining the captured images may allow a post capture adjustment of a perspective of an image of the scene 550. For example, an image of the scene 550 may be generated from the perspective of any of the collaborative imaging devices 500A-D or from the perspective of a point between the devices based on the three-dimensional model of the scene 550 generated from the captured images. Additionally, other parameters of the image may be adjusted, including, for example, a depth of focus and a focal distance.

Figure 6:
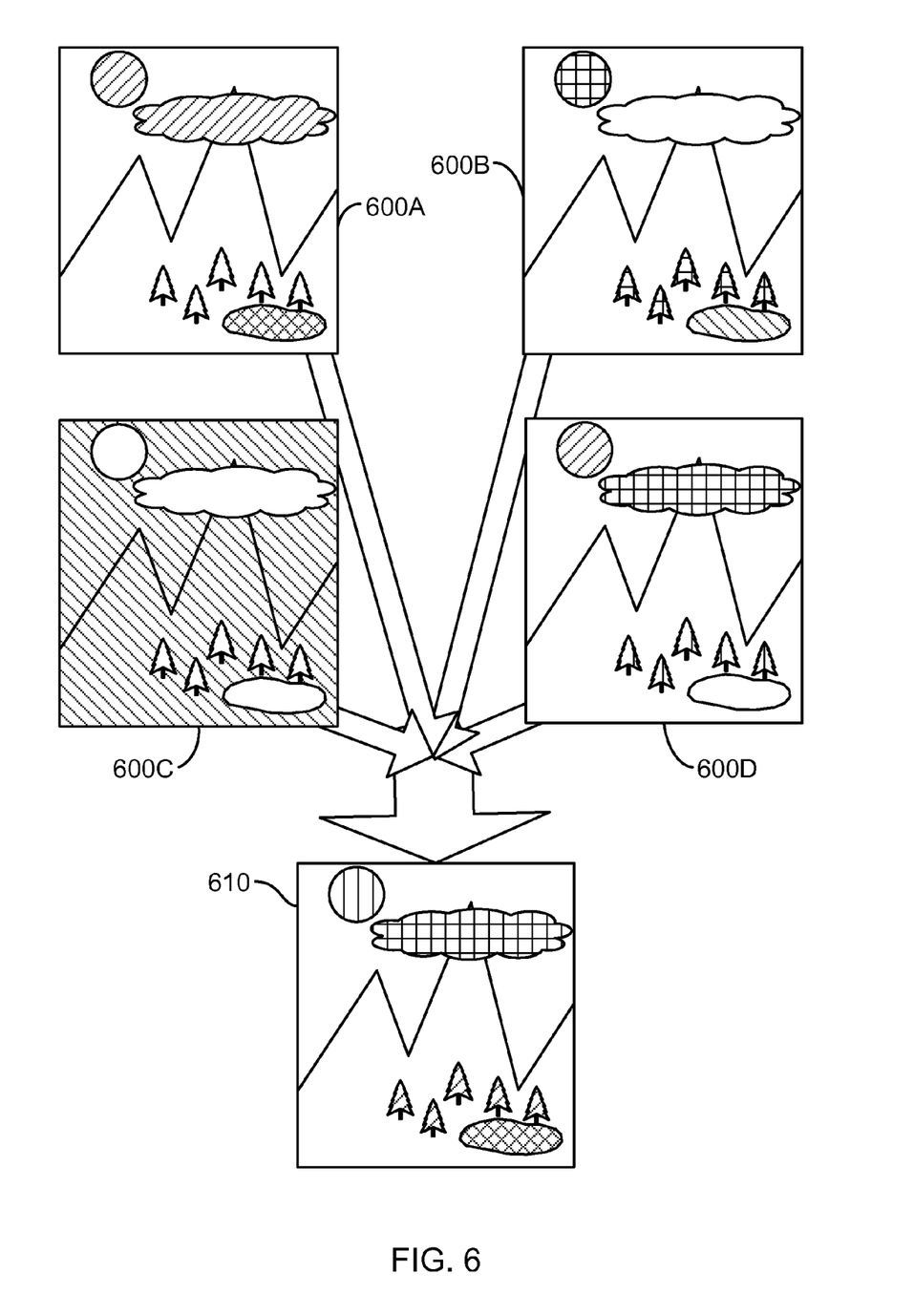
FIG. 6 illustrates embodiments of representative images captured with different spectral sensitivities.

The collaborative imaging devices 500A-D may capture different spectral information about the scene 550. For example, each of the collaborative imaging devices 500A-D may be tuned with different spectral sensitivities, and the respective captured images may include different spectral information about the scene 550. FIG. 6 illustrates embodiments of representative images 600A-D that are captured with different spectral sensitivities. The images 600A-D each include at least some spectral information about the scene that is different than the spectral information in the other images. Two or more of the images 600A-D may be combined to create a collaborative image 610 that includes more spectral information than any single collaborative imaging device 500A-D could capture in a single image.

The collaborative imaging devices 500A-D may exchange captured light information and/or position information via the wireless links 509A-D. One or more of the collaborative imaging devices 500A-D may generate a preview of the collaborative image based on the exchanged captured light information and/or position information. The preview may be transmitted to one or more of the other collaborative imaging devices 500A-D and presented on their respective displays.

The above described systems and methods can be achieved by supplying a storage medium having computer-executable instructions for realizing the above described operations to one or more computing devices (e.g., CPU, MPU) that may read the computer-executable instructions stored in the storage medium and execute them.

In this case, the computer-executable instructions when read from the storage medium and performed by the one or more computing devices execute the operations of the above described embodiments. Thus, the computer-executable instructions or the storage medium storing the computer-executable instructions therein constitute an embodiment.

Any applicable computer-readable storage medium (e.g., a floppy disk, a hard disk, an optical disk, a magneto-optical disk, a CD-ROM, a CD-R, a magnetic tape, a non-volatile memory card, semiconductor memory) can be employed as a storage medium for supplying the computer-executable instructions.

The computer-executable instructions may be stored in a memory provided on a function-extension board inserted into the computing device or on a function-extension unit connected to the computing device, and a CPU provided on the function-extension board or unit may carry out part or all of the actual processing that realizes the operations of the above-described embodiments. Furthermore, when the computer-executable instructions are executed by the one or more computing devices, an operating system working on the computing system may carry out part or all of the actual processing that realizes the operations of the above described embodiments.

While the above disclosure describes illustrative embodiments, it is to be understood that the invention is not limited to the above disclosure. To the contrary, the invention covers various modifications and equivalent arrangements within the spirit and scope of the appended claims.

What is claimed is:

1. A device for collaborative image capturing, the device comprising:
    a computational image sensor including
        an imaging sensor configured to capture one or more images of a field of view;
    a network interface configured to exchange information with one or more other computational image sensors, wherein the exchanged information includes respective images captured by the one or more other computational image sensors; and
    one or more processors configured to control at least one parameter of the imaging sensor and to cause the device to perform operations including
        capturing a first image of the field of view,
        receiving first one or more images from the one or more other computational image sensors,
        adjusting the at least one parameter of the imaging sensor based on the one or more images captured by one or more other computational image sensors,
        capturing a second image of the field of view with the adjusted at least one parameter of the imaging sensor,
        receiving second one or more images from the one or more other computational image sensors, and
        combining the second image of the field of view and the second one or more images captured by the one or more other computational image sensors to generate a combined image.

2. The device of claim 1, wherein an image is a light field image that includes four-dimensional light field data.

3. The device of claim 2, wherein the computational image sensor is a plenoptic sensor.

4. The device of claim 2, wherein the one or more processors are further configured to cause the device to generate a three dimensional model of the field of view based on four-dimensional light field data in the image captured by the computational image sensor and on respective four-dimensional light field data in the images captured by the one or more other computational image sensors.

5. The device of claim 4, wherein the exchanged data includes data that indicates respective positions of the one or more other computational image sensors.

6. The device of claim 1, wherein the imaging sensor parameter is a spectral sensitivity, a focal point, a brightness level, a depth of field, an aperture setting, a flash setting, an exposure time, an ISO setting, or a spatial voltage mask.

7. The device of claim 1, wherein the one or more processors are further configured to cause the device to send adjustment data to the one or more other computational image sensors while the computational image sensor is configured in a master mode, wherein the adjustment data indicates an adjustment to respective imaging sensor parameters of the one or more other computational image sensors.

8. The device of claim 7, wherein the one or more processors are further configured cause the device to send a capture command to the one or more other computational image sensors while the computational image sensor is configured in the master mode, wherein the capture command includes a command to capture respective images by the one or more other computational image sensors.

9. The device of claim 1, wherein the one or more processors are further configured to adjust the at least one imaging sensor parameter according to adjustment data received from the one or more other computational image sensors while the computational image sensor is configured in a slave mode, wherein the adjustment data indicates an adjustment to the at least one imaging sensor parameter.

10. The device of claim 2, wherein the one or more processors are further configured to cause the device to determine if four-dimensional light field image data in the first one or more images received from the one or more other computational image sensors includes four-dimensional light field image data of the field of view of the first image.

11. The device of claim 2, wherein the one or more processors are further configured to cause the device to generate an illumination estimation of the scene based on the four-dimensional light field image data of the first image and the four-dimensional light-field image data of the first one or more images from the one or more other computational image sensors, and wherein adjusting the at least one parameter of the imaging sensor is further based on the illumination estimation.

12. The device of claim 4, wherein adjusting the at least one parameter of the imaging sensor is further based on the three dimensional model of the field of view.

13. The device of claim 2, further comprising generating respective image parameter adjustments for the one or more other computational image sensors based on four-dimensional light field data in the first image and four-dimensional light field data in the first one or more images received from the one or more other computational image sensors, and wherein the second one or more images from the one or more other computational image sensors were captured using the respective image parameter adjustments.

14. The device of claim 1, wherein the second image of the field of view and the second one or more images captured by the one or more other computational image sensors each include different spectral information about the scene.

* * * * *